United States Patent
Park

(10) Patent No.: US 10,035,907 B2
(45) Date of Patent: Jul. 31, 2018

(54) TRANSPARENT THERMOPLASTIC RESIN COMPOSITION AND ARTICLE PRODUCED THEREFROM

(71) Applicant: Lotte Advanced Materials Co., Ltd., Yeosu-si (KR)

(72) Inventor: Dong Hyun Park, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 15/265,982

(22) Filed: Sep. 15, 2016

(65) Prior Publication Data

US 2017/0088704 A1 Mar. 30, 2017

(30) Foreign Application Priority Data

Sep. 30, 2015 (KR) .......................... 10-2015-0138243

(51) Int. Cl.
*C08L 33/12* (2006.01)

(52) U.S. Cl.
CPC .................. *C08L 33/12* (2013.01)

(58) Field of Classification Search
CPC ............. C08L 33/12; C08L 2205/025; C08L 2205/03; C08L 51/06
See application file for complete search history.

(56) References Cited

U.S. PATENT DOCUMENTS

| | | | |
|---|---|---|---|
| 8,314,182 B2 | 11/2012 | Ha et al. | |
| 2010/0202049 A1* | 8/2010 | Kang | C08J 5/18 359/489.2 |
| 2010/0296031 A1* | 11/2010 | Lee | G02B 1/105 349/96 |
| 2011/0152402 A1* | 6/2011 | Jin | C08L 25/14 523/122 |
| 2012/0270965 A1 | 10/2012 | Kim et al. | |
| 2014/0186612 A1* | 7/2014 | Kwon | C08L 25/12 428/327 |
| 2015/0203610 A1 | 7/2015 | Noguchi et al. | |
| 2016/0002455 A1* | 1/2016 | Chung | C08L 33/10 524/504 |
| 2016/0326360 A1 | 11/2016 | Noguchi et al. | |

FOREIGN PATENT DOCUMENTS

| | | | | |
|---|---|---|---|---|
| KR | 10-2007-0108008 A | 11/2007 | | |
| KR | 10-2011-0082121 A | 7/2011 | | |
| KR | 10-2014-0005510 A | 1/2014 | | |
| KR | 10-2015-0037919 A | 4/2015 | | |
| WO | WO 2014007442 A1 * | 1/2014 | ............. | C08L 33/10 |

OTHER PUBLICATIONS

Office Action in counterpart Korean Application No. 10-2015-0138243 dated Oct. 18, 2017, pp. 1-5.

\* cited by examiner

*Primary Examiner* — Mark S Kaucher
(74) *Attorney, Agent, or Firm* — Additon, Higgins & Pendleton, P.A.

(57) ABSTRACT

A thermoplastic resin composition and a molded article formed of the same. The thermoplastic resin composition includes a polyalkyl (meth)acrylate resin, a rubber-modified aromatic vinyl graft copolymer, and an aromatic vinyl resin, wherein the polyalkyl (meth)acrylate resin has a weight average molecular weight of about 100,000 g/mol to about 145,000 g/mol, and the aromatic vinyl resin is a polymer of a monomer mixture comprising alkyl (meth)acrylate, maleic anhydride (MAH), an aromatic vinyl monomer, and a vinyl cyanide monomer. The thermoplastic resin composition can exhibit excellent properties in terms of scratch resistance, heat resistance, impact resistance, and transparency.

19 Claims, No Drawings

TRANSPARENT THERMOPLASTIC RESIN COMPOSITION AND ARTICLE PRODUCED THEREFROM

CROSS-REFERENCE TO RELATED APPLICATION

This application claims priority under 35 USC Section 119 to and the benefit of Korean Patent Application 10-2015-0138243, filed on Sep. 30, 2015, in the Korean Intellectual Property Office, the entire disclosure of which is incorporated herein by reference.

FIELD

The present invention relates to a thermoplastic resin composition and a molded article formed of the same.

BACKGROUND

Tempered glass used as an exterior material for electric/electronic products has low impact strength, has difficulty reducing product weight due to high specific gravity, and has a problem of high manufacturing costs and high probability of breakage due to poor processability and tractability. In order to address these problems, transparent resins are used instead of tempered glass.

Examples of transparent resins used in products requiring transparency include polycarbonate resins, transparent acrylonitrile-butadiene-styrene (ABS) resins, styrene-acrylonitrile (SAN) resins, polystyrene resins, and poly(methyl methacrylate) (PMMA) resins. Polycarbonate resins have good transparency and impact resistance, but have a problem of high price and insufficient scratch resistance and chemical resistance. Transparent ABS resins such as a methylmethacrylate-acrylonitrile-butadiene-styrene (MABS) resin can secure transparency and impact resistance, but have poor properties in terms of scratch resistance, heat resistance, and the like. Moreover, SAN resins, polystyrene resins, and PMMA resins are difficult to use as exterior materials due to insufficient impact resistance thereof, despite advantages of low price and high transparency.

Therefore, there is a need for a transparent thermoplastic resin composition which has excellent properties in terms of scratch resistance, heat resistance, impact resistance, transparency, and balance therebetween and thus can be used as an exterior material for electric/electronic products (for example, as a substitute for tempered glass).

SUMMARY OF THE INVENTION

Embodiments of the present invention relate to a thermoplastic resin composition which can have excellent properties in terms of scratch resistance, heat resistance, impact resistance, and transparency, and a molded article formed of the same.

The thermoplastic resin composition includes: a polyalkyl (meth)acrylate resin; a rubber-modified aromatic vinyl graft copolymer; and an aromatic vinyl resin, wherein the polyalkyl (meth)acrylate resin has a weight average molecular weight of about 100,000 g/mol to about 145,000 g/mol, and the aromatic vinyl resin is a polymer of a monomer mixture including an alkyl (meth)acrylate, maleic anhydride (MAH), an aromatic vinyl monomer, and a vinyl cyanide monomer.

In exemplary embodiments, the thermoplastic resin composition may include about 30 wt % to about 85 wt % of the polyalkyl (meth)acrylate resin, about 5 wt % to about 30 wt % of the rubber-modified aromatic vinyl graft copolymer, and about 10 wt % to about 50 wt % of the aromatic vinyl resin.

In exemplary embodiments, the polyalkyl (meth)acrylate resin may be poly(methyl methacrylate).

In exemplary embodiments, the polyalkyl (meth)acrylate resin may have a glass transition temperature of about 110° C. or higher.

In exemplary embodiments, the rubber-modified aromatic vinyl graft copolymer may be prepared by grafting an aromatic vinyl monomer and a monomer copolymerizable with the aromatic vinyl monomer to a rubbery polymer.

In exemplary embodiments, the rubbery polymer may have an average particle diameter of about 0.1 µm to about 0.5 µm, and the monomer copolymerizable with the aromatic vinyl monomer may include at least one of a vinyl cyanide monomer and an alkyl (meth)acrylic monomer.

In exemplary embodiments, the aromatic vinyl resin may include about 30 mol % to about 80 mol % of the alkyl (meth)acrylate, about 1 mol % to about 40 mol % of the maleic anhydride (MAH), about 10 mol % to about 50 mol % of the aromatic vinyl monomer, and about 0.1 mol % to about 10 mol % of the vinyl cyanide monomer.

In exemplary embodiments, the aromatic vinyl resin may have a glass transition temperature of about 130° C. or higher.

In exemplary embodiments, the thermoplastic resin composition may have a haze of about 2% or less and a light transmittance of about 90% or higher, as measured on an about 2.5 mm thick specimen.

In exemplary embodiments, the thermoplastic resin composition may have a heat deflection temperature of about 100° C. to about 130° C., as measured in accordance with ASTM D648.

In exemplary embodiments, the thermoplastic resin composition may have a scratch width of about 240 µm or less, as measured by a ball-type scratch profile test, and a pencil hardness of 2H or higher, as measured in accordance with ASTM D3362.

In exemplary embodiments, the thermoplastic resin composition may have a notched Izod impact strength of about 5 kgf·cm/cm or higher, as measured on an about ⅛" thick specimen in accordance with ASTM D256.

Other embodiments of the present invention relate to a molded article formed of the thermoplastic resin composition as set forth above.

DETAILED DESCRIPTION

The above and other aspects, features, and advantages of the present invention will become apparent from the detailed description of the following embodiments. It should be understood that the present invention is not limited to the following embodiments and may be embodied in different ways, and that the embodiments are provided for complete disclosure and thorough understanding of the present invention by those skilled in the art. The scope of the present invention should be defined only by the appended claims.

A thermoplastic resin composition according to the present invention includes: (A) a polyalkyl (meth)acrylate resin; (B) a rubber-modified vinyl graft copolymer; and (C) an aromatic vinyl resin.

(A) Polyalkyl (Meth)Acrylate Resin

The polyalkyl (meth)acrylate resin is a transparent thermoplastic resin which has a weight average molecular weight of about 100,000 g/mol to about 145,000 g/mol, for example, about 110,000 g/mol to about 140,000 g/mol, as measured by gel permeation chromatography (GPC). If the weight average molecular weight of the polyalkyl (meth) acrylate resin is less than about 100,000 g/mol, there is a concern that the thermoplastic resin composition has poor heat resistance, whereas if the weight average molecular weight of the polyalkyl (meth)acrylate resin exceeds about 145,000 g/mol, there is a concern that the thermoplastic resin composition has poor moldability (flowability).

In exemplary embodiments, the polyalkyl (meth)acrylate resin may be a polymer of a monomer including at least one of $C_1$ to $C_{10}$ alkyl (meth)acrylates and prepared by any typical polymerization method known in the art. For example, the polyalkyl (meth)acrylate resin may be a copolymer of polymethyl (meth)acrylate, polyethyl (meth)acrylate, polypropyl (meth)acrylate, methyl (meth)acrylate, and/or a $C_2$ to $C_{10}$ alkyl (meth)acrylate, for example poly(methyl methacrylate) (PMMA).

In exemplary embodiments, the polyalkyl (meth)acrylate resin may have a glass transition temperature of about 110° C. or higher, for example, about 110° C. to about 130° C. Within this range, the thermoplastic resin composition can exhibit excellent heat resistance.

In exemplary embodiments, thermoplastic resin composition can include the polyalkyl (meth)acrylate resin in an amount of about 30 wt % to about 85 wt %, for example, about 40 wt % to about 70 wt %, and as another example about 50 wt % to about 65 wt %, based on the total weight (100 wt %) of the thermoplastic resin composition. In some embodiments, the thermoplastic resin composition can include the polyalkyl (meth)acrylate resin in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85 wt %. Further, according to some embodiments, the amount of the polyalkyl (meth)acrylate resin can be in a range from about any of the foregoing amounts to about any other of the foregoing amounts.

Within this range, the thermoplastic resin composition can exhibit excellent properties in terms of transparency, scratch resistance, heat resistance, impact resistance, and balance therebetween.

(B) Rubber-Modified Aromatic Vinyl Graft Copolymer

The rubber-modified aromatic vinyl graft copolymer serves to improve impact resistance of the thermoplastic resin composition with minimal or no deterioration in transparency and is prepared by grafting an aromatic vinyl monomer and a monomer copolymerizable with the aromatic vinyl monomer to a rubbery polymer. For example, the rubber-modified aromatic vinyl graft copolymer may be obtained by adding an aromatic vinyl monomer and a monomer copolymerizable with the aromatic vinyl monomer to a rubbery polymer, followed by polymerization, and may further include a monomer providing processability and heat resistance, as needed. Here, polymerization may be performed by any typical polymerization method known in the art, such as emulsion polymerization, suspension polymerization, and bulk polymerization.

Examples of the rubbery polymer may include without limitation diene rubbers such as polybutadiene, poly(styrene-butadiene), and poly(acrylonitrile-butadiene); saturated rubbers obtained by adding hydrogen to the diene rubbers; isoprene rubbers; acrylic rubbers such as poly(butyl acrylate); ethylene-propylene-diene terpolymer (EPDM), and the like. These may be used alone or as a mixture thereof. For example, the rubbery polymer may be a diene rubber, such as a butadiene rubber.

The rubber-modified aromatic vinyl graft copolymer can include the rubbery polymer in an amount of about 5 wt % to about 65 wt %, for example, about 10 wt % to about 30 wt %, based on the total weight (100 wt %) of the rubber-modified aromatic vinyl graft copolymer. In some embodiments, the rubber-modified aromatic vinyl graft copolymer can include the rubbery polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 wt %. Further, according to some embodiments, the amount of the rubbery polymer can be in a range from about any of the foregoing amounts to about any other of the foregoing amounts.

Within this range, the thermoplastic resin composition including the rubber-modified aromatic vinyl graft copolymer can exhibit excellent heat resistance, flowability, and mechanical properties such as impact resistance.

In exemplary embodiments, the rubbery polymer (or rubber particles) may have an average (Z-average) particle diameter of about 0.1 μm to about 0.5 μm, for example, about 0.2 μm to about 0.4 μm. Within this range, the thermoplastic resin composition including the rubber-modified aromatic vinyl graft copolymer can exhibit excellent heat resistance, flowability, and mechanical properties such as impact resistance.

In exemplary embodiments, the aromatic vinyl monomer and the monomer copolymerizable with the aromatic vinyl monomer may be present in an amount of about 35 wt % to about 95 wt %, for example, about 40 wt % to about 90 wt %, based on the total weight (100 wt %) of the rubber-modified aromatic vinyl graft copolymer. In some embodiments, the rubber-modified aromatic vinyl graft copolymer can include the aromatic vinyl monomer and the monomer copolymerizable with the aromatic vinyl monomer in an amount of about 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments, the amount of the aromatic vinyl monomer and the monomer copolymerizable with the aromatic vinyl monomer can be in a range from about any of the foregoing amounts to about any other of the foregoing amounts.

Within this range, the thermoplastic resin composition including the rubber-modified aromatic vinyl graft copolymer can exhibit excellent heat resistance, flowability, and mechanical properties such as impact resistance.

The aromatic vinyl monomer is graft-copolymerizable with the rubbery copolymer. Examples of the aromatic vinyl monomer may include without limitation styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like. These may be used alone or as a mixture thereof.

The aromatic vinyl monomer may be present in an amount of about 1 mol % to about 50 mol %, for example, about 5 mol % to about 40 mol % based on the total mole number of the aromatic vinyl monomer and the monomer copolymerizable with the aromatic vinyl monomer. In some embodiments, the aromatic vinyl monomer may be present in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 mol %. Further, according to some embodiments, the amount of the aromatic vinyl monomer can be in a range from about any of the foregoing amounts to about any other of the foregoing amounts.

Within this range, the thermoplastic resin composition including the rubber-modified aromatic vinyl graft copolymer can exhibit excellent heat resistance, flowability, and mechanical properties such as impact resistance.

In exemplary embodiments, the monomer copolymerizable with the aromatic vinyl monomer may include at least one of a vinyl cyanide monomer and an alkyl (meth)acrylic monomer. For example, the monomer copolymerizable with the aromatic vinyl monomer may be a vinyl cyanide monomer or a mixture of a vinyl cyanide monomer and an alkyl (meth)acrylic monomer, for example a mixture of a vinyl cyanide monomer and an alkyl (meth)acrylic monomer.

The monomer copolymerizable with the aromatic vinyl monomer may be present in an amount of about 50 mol % to about 99 mol %, for example, about 60 mol % to about 95 mol %, based on the total mole number of the aromatic vinyl monomer and the monomer copolymerizable with the aromatic vinyl monomer. In some embodiments, the monomer copolymerizable with the aromatic vinyl monomer may be present in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 mol %. Further, according to some embodiments, the amount of the monomer copolymerizable with the aromatic vinyl monomer can be in a range from about any of the foregoing amounts to about any other of the foregoing amounts.

Within this range, the thermoplastic resin composition including the rubber-modified aromatic vinyl graft copolymer can exhibit excellent heat resistance, flowability, and mechanical properties such as impact resistance.

Examples of the vinyl cyanide monomer may include without limitation acrylonitrile, methacrylonitrile, ethacrylonitrile, phenylacrylonitrile, α-chloroacrylonitrile, fumaronitrile, and the like. These may be used alone or as a mixture thereof. For example, the vinyl cyanide monomer may include acrylonitrile and/or methacrylonitrile.

Examples of the alkyl (meth)acrylic monomer may include without limitation (meth)acrylic acid and/or $C_1$ to $C_{10}$ alkyl (meth)acrylate. These may be used alone or as a mixture thereof. For example, the alkyl (meth)acrylic monomer may include methyl methacrylate and/or methyl acrylate.

When the monomer copolymerizable with the aromatic vinyl monomer is a mixture of a vinyl cyanide monomer and an alkyl (meth)acrylic monomer, the vinyl cyanide monomer may be present in an amount of about 1 mol % to about 40 mol %, for example, about 2 mol % to about 35 mol %, based on the total mole number of the monomer copolymerizable with the aromatic vinyl monomer, and the alkyl (meth)acrylic monomer may be present in an amount of about 60 mol % to about 99 mol %, for example, about 65 mol % to about 98 mol %, based on the total mole number of the monomer copolymerizable with the aromatic vinyl monomer.

In some embodiments, the mixture of the vinyl cyanide monomer and alkyl (meth)acrylic monomer can include the vinyl cyanide monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 mol %, based on the total mole number of the monomer copolymerizable with the aromatic vinyl monomer. Further, according to some embodiments, the amount of the vinyl cyanide monomer can be in a range from about any of the foregoing amounts to about any other of the foregoing amounts.

In some embodiments, the mixture of the vinyl cyanide monomer and alkyl (meth)acrylic monomer can include the alkyl (meth)acrylic monomer in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 mol %. Further, according to some embodiments, the amount of the alkyl (meth)acrylic monomer can be in a range from about any of the foregoing amounts to about any other of the foregoing amounts.

Within this range, the thermoplastic resin composition can exhibit excellent properties in terms of heat resistance, processability, and the like.

Examples of the rubber-modified aromatic vinyl graft copolymer may include without limitation an acrylonitrile-butadiene-styrene graft copolymer (g-ABS) and/or methyl methacrylate-acrylonitrile-butadiene-styrene graft copolymer resin (g-MABS), and may be, for example, g-MABS. Here, the g-MABS may include a polybutadiene (PBD) core, which is a rubbery polymer, and a methyl methacrylate-acrylonitrile-styrene copolymer shell grafted to the core, wherein the shell may include an inner shell of an acrylonitrile-styrene resin and an outer shell of poly(methyl methacrylate), without being limited thereto.

In exemplary embodiments, the thermoplastic resin composition can include the rubber-modified aromatic vinyl graft copolymer in an amount of about 5 wt % to about 30 wt %, for example, about 5 wt % to about 25 wt %, and as another example about 10 wt % to about 20 wt %, based on the total weight (100 wt %) of the thermoplastic resin composition. In some embodiments, the thermoplastic resin composition can include the rubber-modified aromatic vinyl graft copolymer in an amount of about 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments, the amount of the rubber-modified aromatic vinyl graft copolymer can be in a range from about any of the foregoing amounts to about any other of the foregoing amounts.

Within this range, the thermoplastic resin composition can exhibit excellent properties in terms of transparency, scratch resistance, heat resistance, impact resistance, and balance therebetween.

(C) Aromatic Vinyl Resin

The aromatic vinyl resin can serve to improve heat resistance, impact resistance, and transparency of the thermoplastic resin composition and is a polymer (quaternary polymer) of a monomer mixture including an alkyl (meth)acrylate, maleic anhydride (MAH), an aromatic vinyl monomer, and a vinyl cyanide monomer. For example, the aromatic vinyl resin may be obtained by reacting the monomer mixture by any typical polymerization method known in the art.

Examples of the alkyl (meth)acrylate may include without limitation $C_1$ to $C_{10}$ alkyl (meth)acrylates. These may be used alone or as a mixture thereof. For example, the alkyl (meth)acrylate may include methyl methacrylate, methyl acrylate, and the like.

The monomer mixture can include the alkyl (meth)acrylate in an amount of about 30 mol % to about 80 mol %, for example, about 35 mol % to about 75 mol %, based on the total mole number of the monomer mixture. In some embodiments, the monomer mixture can include the alkyl (meth)acrylate in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 mol %. Further, according to some embodiments, the amount of the alkyl (meth)acrylate can be in a range from about any of the foregoing amounts to about any other of the foregoing amounts.

Within this range, the thermoplastic resin composition can exhibit excellent properties in terms of heat resistance, transparency, and the like.

In exemplary embodiments, the monomer mixture can include the maleic anhydride in an amount of about 1 mol % to about 40 mol %, for example, about 5 mol % to about 30 mol %, based on the total mole number of the monomer mixture. In some embodiments, the monomer mixture can include the maleic anhydride in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 mol %. Further, according to some embodiments, the amount of the maleic anhydride can be in a range from about any of the foregoing amounts to about any other of the foregoing amounts.

Within this range, the thermoplastic resin composition can exhibit excellent properties in terms of heat resistance, transparency, and the like.

Examples of the aromatic vinyl monomer may include without limitation styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like. These may be used alone or as a mixture thereof.

The monomer mixture can include the aromatic vinyl monomer in an amount of about 10 mol % to about 50 mol %, for example, about 15 mol % to about 45 mol %, based on the total mole number of the monomer mixture. In some embodiments, the monomer mixture can include the aromatic vinyl monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 mol %. Further, according to some embodiments, the amount of the aromatic vinyl monomer can be in a range from about any of the foregoing amounts to about any other of the foregoing amounts.

Within this range, the thermoplastic resin composition can exhibit excellent properties in terms of heat resistance, impact resistance, and the like.

Examples of the vinyl cyanide monomer may include without limitation acrylonitrile, methacrylonitrile, ethacrylonitrile, phenylacrylonitrile, α-chloroacrylonitrile, fumaronitrile, and the like. These may be used alone or as a mixture thereof. For example, the vinyl cyanide monomer may include acrylonitrile and/or methacrylonitrile.

The monomer mixture can include the vinyl cyanide monomer in an amount of about 0.1 mol % to about 10 mol %, for example, about 0.5 mol % to about 9 mol %, based on the total mole number of the monomer mixture. In some embodiments, the monomer mixture can include the vinyl cyanide monomer in an amount of about 0.1, 0.2, 0.3, 0.4, 0.5, 0.6, 0.7, 0.8, 0.9, 1, 2, 3, 4, 5, 6, 7, 8, 9, or 10 mol %. Further, according to some embodiments, the amount of the vinyl cyanide monomer can be in a range from about any of the foregoing amounts to about any other of the foregoing amounts.

Within this range, the thermoplastic resin composition can exhibit excellent properties in terms of heat resistance, impact resistance, and the like.

In exemplary embodiments, the aromatic vinyl resin may have a weight average molecular weight of about 50,000 g/mol to about 200,000 g/mol, for example, about 100,000 g/mol to about 180,000 g/mol, as measured by gel permeation chromatography (GPC). Within this range, the thermoplastic resin composition can exhibit excellent properties in terms of heat resistance, processability, and the like.

In exemplary embodiments, the aromatic vinyl resin may have a glass transition temperature of about 130° C. or higher, for example, about 130° C. to about 160° C. Within this range, the thermoplastic resin composition can exhibit excellent properties in terms of heat resistance and the like.

In exemplary embodiments, the thermoplastic resin composition can include the aromatic vinyl resin in an amount of about 10 wt % to about 50 wt %, for example, about 15 wt % to about 45 wt %, and as another example about 20 wt % to about 40 wt %, based on the total weight (100 wt %) of the thermoplastic resin composition. In some embodiments, the thermoplastic resin composition can include the aromatic vinyl resin in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments, the amount of the aromatic vinyl resin can be in a range from about any of the foregoing amounts to about any other of the foregoing amounts.

Within this range, the thermoplastic resin composition can exhibit excellent properties in terms of transparency, scratch resistance, heat resistance, impact resistance, and balance therebetween.

As needed, the thermoplastic resin composition according to exemplary embodiments of the present invention may further include one or more additives, such as additives selected from among flame retardants, fillers, antioxidants, lubricants, release agents, nucleating agents, antistatic agents, stabilizers, colorants, and the like, and mixtures thereof without altering the effects of the invention. The additives may be present in an amount of about 10 parts by weight or less based on about 100 parts by weight of the aforementioned components ((A)+(B)+(C)).

The thermoplastic resin composition according to exemplary embodiments of the present invention may have a haze of about 2% or less, for example, about 0.1% to about 1.5%, and a light transmittance of about 90% or higher, for example, about 90% to about 96%, as measured on an about 2.5 mm thick specimen in accordance with ASTM D1003. Within these ranges, the thermoplastic resin composition can exhibit sufficient transparency and thus can be useful as a substitute for tempered glass.

In exemplary embodiments, the thermoplastic resin composition may have a heat deflection temperature of about 100° C. to about 130° C., for example, about 100° C. to about 120° C., as measured in accordance with ASTM D648. Within this range, the thermoplastic resin composition can have excellent heat resistance and thus can be useful as an exterior material for electric/electronic products.

In exemplary embodiments, the thermoplastic resin composition may have a scratch width of about 240 μm or less, for example, about 150 μm to about 240 μm, as measured by the ball type scratch profile test and a pencil hardness of 2H or higher, for example, 2H or 3H, as measured in accordance with ASTM D3362. Within these ranges, the thermoplastic resin composition can have excellent scratch resistance and thus can be useful as an exterior material for electric/electronic products.

In exemplary embodiments, the thermoplastic resin composition may have a notched Izod impact strength of about 5 kgf·cm/cm or higher, for example, about 5 kgf·cm/cm to about 20 kgf·cm/cm, as measured on an about 1/8" thick specimen in accordance with ASTM D256. Within this range, the thermoplastic resin composition can have excellent impact resistance and thus can be useful as an exterior material for electric/electronic products.

A molded article according to the present invention is formed of the thermoplastic resin composition as set forth above. The thermoplastic resin composition may be prepared by any suitable thermoplastic resin composition preparation method known in the art. For example, the aforementioned components and, optionally, the additive(s), can be mixed, followed by melt extrusion in an extruder, thereby preparing a thermoplastic resin composition in pellet form. The prepared pellets may be produced into various molded articles (products) by various molding methods such as injection molding, extrusion, vacuum molding, and casting. Such molding methods are well known to those skilled in the art to which the present invention pertains. The molded article may be applied to various fields such as an interior/exterior material for electric/electronic products and automotive parts. For example, the molded article can be useful as a substitute for tempered glass, which is typically used as an exterior material for electric/electronic products.

Hereinafter, the present invention will be described in more detail with reference to the following examples. It should be understood that these examples are provided for illustration only and are not to be construed in any way as limiting the present invention.

EXAMPLE

Details of components used in the following Examples and Comparative Examples are as follows:

(A) Polyalkyl (meth)acrylate resin (A1) Poly(methyl methacrylate) (PMMA) (glass transition temperature: 116° C.) having a weight average molecular weight of 130,000 g/mol as measured by GPC is used.

(A2) Poly(methyl methacrylate) (PMMA) (glass transition temperature: 99° C.) having a weight average molecular weight of 90,000 g/mol as measured by GPC is used.

(A3) Poly(methyl methacrylate) (PMMA) (glass transition temperature: 120° C.) having a weight average molecular weight of 150,000 g/mol as measured by GPC is used.

(B) Rubber-modified aromatic vinyl graft copolymer

A core-shell type graft copolymer (g-MABS) prepared by grafting 40 wt % of styrene, acrylonitrile, and methyl methacrylate (styrene/acrylonitrile/methyl methacrylate: 20 mol %/10 mol %/70 mol %) to 60 wt % of butadiene rubber having an average particle diameter of 0.27 μm is used.

(C) Aromatic vinyl resin (C1) A resin (weight average molecular weight: 160,000 g/mol, glass transition temperature: 140° C.) prepared through polymerization of 50 mol % of methyl methacrylate with 20 mol % of maleic anhydride, 28 mol % of styrene, and 2 mol % of acrylonitrile is used.

(C2) A resin (MSAN resin) (weight average molecular weight: 100,000 g/mol, glass transition temperature: 102° C.) prepared through polymerization of 75 mol % of methyl methacrylate with 20 mol % of styrene and 5 mol % of acrylonitrile is used.

(C3) A resin (SAN resin) (weight average molecular weight: 150,000 g/mol, glass transition temperature: 105° C.) prepared through polymerization of 80 mol % of styrene with 20 mol % of acrylonitrile is used.

Examples 1 to 3 and Comparative Examples 1 to 4

The above components are placed into a twin-screw extruder at 230° C. in amounts as listed in Table 1, followed by melt extrusion, thereby preparing a thermoplastic resin composition in pellet form. The prepared pellets are dried at 80° C. for 4 hours or more, followed by injection molding using an injection molding machine at an injection temperature of 250° C. and at a mold temperature of 80° C., thereby preparing a specimen for property evaluation. The prepared specimen is evaluated as to the following properties, and results are shown in Table 1.

Property Evaluation (1) Notched Izod impact strength (unit: kgf·cm/cm): Izod impact strength is measured on a ⅛" thick notched specimen in accordance with ASTM D256. A higher value indicates better impact resistance.

(2) Heat deflection temperature (HDT) (unit: ° C.): A temperature at which a 6.4 mm thick specimen bent up to 0.254 mm is measured under a load of 18.5 kgf/cm² at a heating rate of 2° C./min in accordance with ASTM D648. A higher value indicates better heat resistance.

(3) Scratch width (unit: μm): Scratch width is measured by the ball-type scratch profile (BSP) test. A scratch having a length of 10 mm to 20 mm is made on a surface of a specimen having a size of 90 mm×50 mm×2.5 mm (length-xwidthxthickness) under a load of 1,000 g at a scratch speed of 75 mm/min using a spherical metal tip having a diameter of 0.7 mm. A profile of the scratch is scanned with a metal stylus tip having a diameter of 2 μm using a contact-type surface profile analyzer (XP-1, Ambios Technology), thereby measuring a scratch width, which is a measure of scratch resistance. A lower value indicates better scratch resistance.

(4) Pencil hardness: Pencil hardness is measured under a load of 500 g in accordance with ASTM D3362. In terms of scratch resistance, a specimen is rated as 3B, 2B, B, HB, F, H, 2H, 3H, and so on. A higher H value indicates better scratch resistance, and higher B value indicates poorer scratch resistance.

(5) Haze and light transmittance (unit: %): Haze and light transmittance (total luminous transmittance) are measured on a 2.5 mm thick specimen using a haze meter (NDH 2000, Nippon Denshoku Industries Co., LTD.) in accordance with ASTM D1003.

(6) Melt-flow Index (MI) (unit: g/10 min): Melt-flow Index is measured at 220° C./10 kgf in accordance with ASTM D1238.

TABLE 1

|  |  | Example | | | Comparative Example | | | |
|---|---|---|---|---|---|---|---|---|
|  |  | 1 | 2 | 3 | 1 | 2 | 3 | 4 |
| (A) (wt %) | (A1) | 58 | 57 | 55 | — | — | 55 | 55 |
|  | (A2) | — | — | — | 55 | — | — | — |
|  | (A3) | — | — | — | — | 55 | — | — |
| (B) (wt %) |  | 10 | 12 | 15 | 12 | 12 | 12 | 12 |
| (C) (wt %) | (C1) | 32 | 31 | 30 | 31 | 31 | — | — |
|  | (C2) | — | — | — | — | — | 31 | — |
|  | (C3) | — | — | — | — | — | — | 31 |
| Notched Izod impact strength (kgf · cm/cm) |  | 5 | 5 | 6 | 5 | 6 | 3 | 5 |
| Heat deflection temperature (° C.) |  | 107 | 106 | 104 | 95 | 92 | 90 | 91 |
| BSP scratch width (μm) |  | 211 | 228 | 232 | 233 | 240 | 245 | 252 |
| Pencil hardness |  | 2H | 2H | 2H | 2H | H | H | H |
| Haze (%) |  | 1.0 | 1.0 | 1.0 | 1.0 | 1.0 | 4.5 | 7.0 |
| Light transmittance (%) |  | 92 | 92 | 92 | 92 | 92 | 85 | 82 |
| Melt-flow index (g/10 min) |  | 7 | 6 | 5 | 9 | 2 | 9 | 9 |

From the results shown in Table 1, it can be seen that the thermoplastic resin compositions according to the present invention (Examples 1 to 3) have excellent properties in terms of scratch resistance, heat resistance, impact resistance, transparency, processability (flowability), and balance therebetween and are suitable as a substitute for tempered glass.

Conversely, it can be seen that the thermoplastic resin composition of Comparative Example 1 in which PMMA having a weight average molecular weight of less than 100,000 g/mol is used exhibits poor heat resistance; the thermoplastic resin composition of Comparative Example 2 in which PMMA having a weight average molecular weight of greater than 145,000 g/mol is used exhibits poor heat resistance and flowability; the thermoplastic resin composition of Comparative Example 3 in which the MSAN resin is used instead of the aromatic vinyl resin according to the present invention exhibits poor properties in terms of transparency, scratch resistance, heat resistance, and the like; and the thermoplastic resin composition of Comparative Example 4 in which the SAN resin is used exhibits poor properties in terms of transparency, scratch resistance, heat resistance, and the like.

Example embodiments have been disclosed herein, and although specific terms are employed, they are used and are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, and alterations can be made by those skilled in the art without departing from the spirit and scope of the invention. Therefore, the scope of the present invention should be defined by the appended claims and equivalents thereof.

What is claimed is:

1. A thermoplastic resin composition comprising:
   a polyalkyl (meth)acrylate resin having a weight average molecular weight of about 100,000 g/mol to about 145,000 g/mol;
   a rubber-modified aromatic vinyl graft copolymer; and
   an aromatic vinyl resin, wherein the aromatic vinyl resin is a polymer of a monomer mixture comprising about 35 mol % to about 80 mol % of an alkyl (meth)acrylate, about 20 mol % to about 40 mol % of maleic anhydride (MAH), about 10 mol % to about 50 mol % of an aromatic vinyl monomer, and about 0.1 mol % to about 10 mol % of a vinyl cyanide monomer.

2. The thermoplastic resin composition according to claim 1, comprising: about 30 wt % to about 85 wt % of the polyalkyl (meth)acrylate resin, about 5 wt % to about 30 wt % of the rubber-modified aromatic vinyl graft copolymer, and about 10 wt % to about 50 wt % of the aromatic vinyl resin.

3. The thermoplastic resin composition according to claim 1, wherein the polyalkyl (meth)acrylate resin is poly(methyl methacrylate).

4. The thermoplastic resin composition according to claim 1, wherein the polyalkyl (meth)acrylate resin has a glass transition temperature of about 110° C. or higher.

5. The thermoplastic resin composition according to claim 1, wherein the rubber-modified aromatic vinyl graft copolymer is prepared by grafting an aromatic vinyl monomer and a monomer copolymerizable with the aromatic vinyl monomer to a rubbery polymer.

6. The thermoplastic resin composition according to claim 5, wherein the rubbery polymer has an average particle diameter of about 0.1 μm to about 0.5 μm, and the monomer copolymerizable with the aromatic vinyl monomer comprises at least one of a vinyl cyanide monomer and an alkyl (meth)acrylic monomer.

7. The thermoplastic resin composition according to claim 1, wherein the aromatic vinyl resin has a glass transition temperature of about 130° C. or higher.

8. The thermoplastic resin composition according to claim 1, wherein the thermoplastic resin composition has a haze of about 2% or less and a light transmittance of about 90% or higher, as measured on an about 2.5 mm thick specimen.

9. The thermoplastic resin composition according to claim 1, wherein the thermoplastic resin composition has a heat deflection temperature of about 100° C. to about 130° C., as measured in accordance with ASTM D648.

10. The thermoplastic resin composition according to claim 1, wherein the thermoplastic resin composition has a scratch width of about 240 μm or less, as measured by a ball-type scratch profile test, and a pencil hardness of 2H or higher, as measured in accordance with ASTM D3362.

11. The thermoplastic resin composition according to claim 1, wherein the thermoplastic resin composition has a notched Izod impact strength of about 5 kgf·cm/cm or higher, as measured on an about ⅛" thick specimen in accordance with ASTM D256.

12. A molded article formed of the thermoplastic resin composition according to claim 1.

13. The thermoplastic resin composition according to claim 1, wherein the aromatic vinyl resin comprises about 40 mol % to about 80 mol % of the alkyl (meth)acrylate.

14. The thermoplastic resin composition according to claim 1, wherein the aromatic vinyl resin comprises about 45 mol % to about 80 mol % of the alkyl (meth)acrylate.

15. The thermoplastic resin composition according to claim 1, wherein the aromatic vinyl resin comprises about 50 mol % to about 80 mol % of the alkyl (meth)acrylate.

16. The thermoplastic resin composition according to claim 1, wherein the thermoplastic resin composition has a haze of about 2% or less and a light transmittance of about 90% or higher, as measured on an about 2.5 mm thick specimen; a heat deflection temperature of about 100° C. to about 130° C., as measured in accordance with ASTM D648; a scratch width of about 240 μm or less, as measured by a ball-type scratch profile test, and a pencil hardness of 2H or higher, as measured in accordance with ASTM D3362; and a notched Izod impact strength of about 5 kgf·cm/cm or higher, as measured on an about ⅛" thick specimen in accordance with ASTM D256.

17. The thermoplastic resin composition according to claim 16, wherein the thermoplastic resin composition has a haze of about 0.1% to about 1.5% and a light transmittance of about 90% to about 96%, as measured on an about 2.5 mm thick specimen; a heat deflection temperature of about 100° C. to about 120° C., as measured in accordance with ASTM D648; a scratch width of about 150 μm to about 240 μm, as measured by a ball-type scratch profile test, and a pencil hardness of 2H or 3H, as measured in accordance with ASTM D3362; and a notched Izod impact strength of about 5 kgf·cm/cm to about 20 kgf·cm/cm, as measured on an about ⅛" thick specimen in accordance with ASTM D256.

18. The molded article according to claim 12, wherein the molded article has a haze of about 2% or less and a light transmittance of about 90% or higher, as measured on an about 2.5 mm thick specimen; a heat deflection temperature of about 100° C. to about 130° C., as measured in accordance with ASTM D648; a scratch width of about 240 μm or less, as measured by a ball-type scratch profile test, and a pencil hardness of 2H or higher, as measured in accordance with ASTM D3362; and a notched Izod impact strength of about 5 kgf·cm/cm or higher, as measured on an about ⅛" thick specimen in accordance with ASTM D256.

19. The molded article according to claim 18, wherein the molded article has a haze of about 0.1% to about 1.5% and a light transmittance of about 90% to about 96%, as measured on an about 2.5 mm thick specimen; a heat deflection temperature of about 100° C. to about 120° C., as measured in accordance with ASTM D648; a scratch width of about 150 μm to about 240 μm, as measured by a ball-type scratch profile test, and a pencil hardness of 2H or 3H, as measured in accordance with ASTM D3362; and a notched Izod impact strength of about 5 kgf·cm/cm to about 20 kgf·cm/cm, as measured on an about ⅛" thick specimen in accordance with ASTM D256.

* * * * *